United States Patent [19]

Cseh et al.

[11] Patent Number: 4,639,477
[45] Date of Patent: Jan. 27, 1987

[54] PROCESS FOR COLORING HIGH-MOLECULAR ORGANIC MATERIAL, AND NOVEL METAL COMPLEXES OF OXIME(S) OF O-HYDROXY BENZALDEHYDE(S) AND KETONE(S)

[75] Inventors: Georg Cseh, Posat; Paul Lienhard, Frenkendorf, both of Switzerland

[73] Assignee: Ciba-Geigy Corporation, Ardsley, N.Y.

[21] Appl. No.: 745,033

[22] Filed: Jun. 13, 1985

[30] Foreign Application Priority Data

Jun. 15, 1984 [CH] Switzerland .................. 2914/84

[51] Int. Cl.$^4$ .................. C08K 5/23; C09B 45/00; C09B 56/02
[52] U.S. Cl. .................. 524/83; 8/506; 8/508; 8/513; 8/687; 106/23; 106/162; 106/164; 106/168; 106/193 P; 106/262; 106/288 Q; 106/308 M; 106/308 Q; 106/308 N; 524/89; 524/90; 524/190; 524/567; 524/583
[58] Field of Search .................. 524/89, 90, 190, 567, 524/83; 106/287.18, 193 P, 162, 164, 168, 23, 288 Q, 308 M, 308 Q; 8/687, 506, 508, 513

[56] References Cited

U.S. PATENT DOCUMENTS

| | | | |
|---|---|---|---|
| 3,956,266 | 5/1976 | Mory et al. | 106/23 |
| 3,988,323 | 10/1976 | L'Eplattenier et al. | 546/77 |
| 4,046,755 | 9/1977 | Mory et al. | 534/582 |
| 4,100,156 | 7/1978 | Muller | 524/190 |
| 4,239,843 | 12/1980 | Hara et al. | 524/89 |
| 4,358,287 | 11/1982 | Wicki et al. | 8/540 |
| 4,439,562 | 3/1984 | Bohler | 524/90 |
| 4,544,372 | 10/1985 | Heise et al. | 8/602 |

FOREIGN PATENT DOCUMENTS 42-3391 2/1967 Japan .

Primary Examiner—Herbert J. Lilling
Attorney, Agent, or Firm—Luther A. R. Hall

[57] ABSTRACT

Process for mass-coloring high-molecular organic material, which comprises using a metal complex of the formulae I and/or Ia

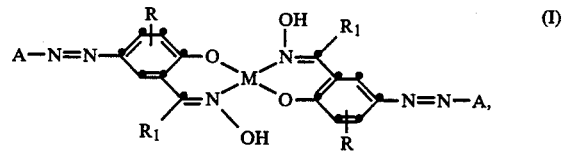

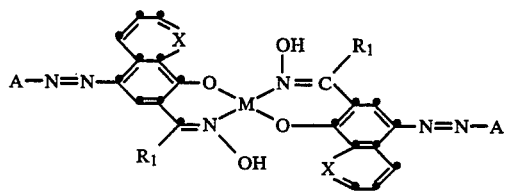

in which R is a hydrogen or chlorine atom or a methyl or methoxy group, $R_1$ is a hydrogen atom, $C_1$-$C_4$-alkyl or phenyl which is unsubstituted or substituted by halogen, $C_1$-$C_4$-alkyl, $C_1$-$C_4$-alkoxy, —$NO_2$, —$CONH_2$ —$CONHR_2$ or $C_2$-$C_5$-N-alkylcarbamoyl, X is —CH═ or —N═, M is a divalent transition metal, and A is phenyl or substituted phenyl and $R_2$ is alkyl, phenyl or substituted phenyl.

The resulting colorations are distinguished by high tinctorial strength and good fastness properties, such as light, weathering and migration fastness properties.

3 Claims, No Drawings

PROCESS FOR COLORING HIGH-MOLECULAR ORGANIC MATERIAL, AND NOVEL METAL COMPLEXES OF OXIME(S) OF O-HYDROXY BENZALDEHYDE(S) AND KETONE(S)

The invention relates to a process for mass-colouring high-molecular organic material and to novel metal complexes from oximes of o-hydroxybenzaldehydes or o-hydroxyketones used therefor.

It is known to use azo dyes which contain an aldoxime group as disperse dyes for dyeing synthetic fibres. For instance, Japanese Auslegesschrift No. 67-3,391 describes nickel complexes from salicylaldoxime for dyeing polypropylene.

The present invention provides a process for masscolouring high-molecular organic material, which comprises using compounds of the formulae I and/or Ia

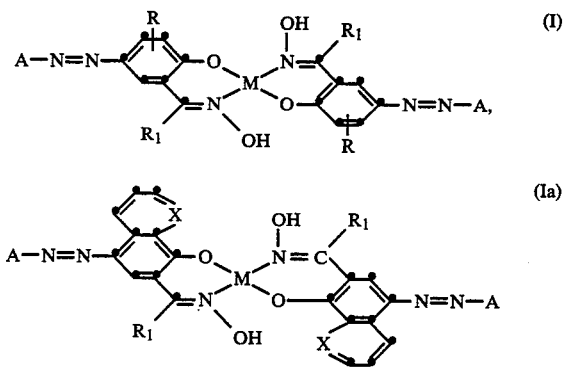

in which

A is a phenyl radical which is unsubstituted or substituted by halogen, phenyl, phenylazo, carboxyl, —$CF_3$, —$NO_2$, —CN, $C_1$–$C_4$-alkyl, $C_1$–$C_4$-alkoxy, —$CONH_2$, —$SO_2NH_2$, —$CONHR_2$, —$COOR_3$, —$NHCOR_4$ or —$SO_2NHR_2$, where $R_2$ is $C_1$–$C_4$-alkyl or phenyl which is unsubstituted or substituted by halogen, —$CF_3$, —$C_1$–$C_4$-alkyl, $C_1$–$C_4$-alkoxy, —$NO_2$, —CN, —$CONH_2$, —$SO_2NH_2$, —$CONHC_1$–$C_4$-alkyl, —$CONHC_6H_5$, $C_2$–$C_5$-alkoxycarbonyl, $C_2$–$C_5$-N-alkylcarbamoyl, —$NHCOC_6H_5$, —$SO_2NH$–$C_1$–$C_4$-alkyl or —$SO_2NHC_6H_5$, $R_3$ is $C_1$–$C_4$-alkyl, benzyl which is unsubstituted or substituted by halogen or $C_1$–$C_4$-alkyl, or phenyl which is unsubstituted or substituted by halogen, $C_1$–$C_4$-alkyl, $C_1$–$C_4$-alkoxy, $C_2$–$C_5$-alkoxycarbonyl or $C_2$–$C_5$-N-alkylcarbamoyl, and $R_4$ is $C_1$–$C_4$-alkyl or phenyl which is unsubstituted or substituted by halogen, $C_1$–$C_4$-alkyl, $C_1$–$C_4$-alkoxy, —$NO_2$ or $C_2$–$C_5$-N-alkylcarbamoyl, and A is also a naphthyl radical which is unsubstituted or substituted by halogen or —$CH_3$, an anthraquinonyl radical which is unsubstituted or substituted by halogen, —$NO_2$, —$CH_3$, —$OCH_3$, —NHCOCH$_3$ or —NHCOC$_6H_5$, or a heterocyclic aromatic radical which is unsubstituted or substituted by —Cl, —$CH_3$ or —$OCH_3$, R is —H, —Cl, —$CH_3$ or —$OCH_3$, $R_1$ is —H, $C_1$–$C_4$-alkyl or phenyl which is unsubstituted or substituted by halogen, $C_1$–$C_4$-alkyl, $C_1$–$C_4$-alkoxy, —$NO_2$, —$CONH_2$, —$CONHR_2$ or $C_2$–$C_5$-N-alkylcarbamoyl, X is —CH= or —N=, and M is a divalent transition metal, $R_2$ being as defined above.

In a phenyl A, $R_1$, $R_2$, $R_3$ and $R_4$ which is substituted by $C_1$–$C_4$-alkyl or $C_1$–$C_4$-alkoxy groups, these groups number 1 to 3 and are for example methyl, ethyl, n-propyl, isopropyl, n-butyl, isobutyl and tert.-butyl groups on the one hand and methoxy, ethoxy, n-propoxy, isopropoxy, n-butoxy, isobutoxy and tert.-butoxy groups on the other, but are in particular, methyl and methoxy groups respectively.

The halogen in halogen-substituted phenyl, naphthyl and anthraquinonyl A, halogen-substituted benzyl $R_3$ and halogen-substituted phenyl $R_1$, $R_2$, $R_3$ and $R_4$ is fluorine, chlorine, bromine and iodine atoms, but in particular chlorine atoms.

A $C_1$–$C_4$-alkyl $R_2$, $R_3$ or $R_4$ is a methyl, ethyl, n-propyl, isopropyl, n-butyl, isobutyl or tert.-butyl group, in the case of $R_2$ in particular a methyl group and in the cases of $R_3$ and $R_4$ in particular methyl and ethyl groups.

A $C_1$–$C_4$-alkyl $R_1$ is for example a methyl, ethyl, isopropyl or tert.-butyl group, but in particular a methyl group.

The $C_1$–$C_4$-alkyl group in $C_1$–$C_4$-alkyl substituted benzyl $R_3$ is for example a methyl, ethyl, isopropyl or isobutyl group.

The $C_2$–$C_5$-alkoxycarbonyl in $C_2$–$C_5$-alkoxycarbonyl-substituted phenyl $R_2$ and $R_3$ is for example a methoxycarbonyl, ethoxycarbonyl, propoxycarbonyl, isopropoxycarbonyl, butoxycarbonyl, isobutoxycarbonyl or tert.-butoxycarbonyl group.

The $C_2$–$C_5$-N-alkylcarbamoyl in $C_2$–$C_5$-N-alkylcarbamoyl-substituted phenyl $R_1$, $R_2$, $R_3$ and $R_4$ is for example an acetylamino, propionylamino, butyrylamino, isobutyrylamino, valerylamino or isovalerylamino group, but in particular an acetylamino group.

The alkyl group in phenyl $R_2$ which is substituted by —$CONHC_1$–$C_4$-alkyl or —$SO_2NHC_1$–$C_4$-alkyl is for example a methyl, ethyl, propyl, isopropyl or butyl group.

The —$CONHC_6H_5$, —$NHCOC_6H_5$ and —$SO_2NHC_6H_5$ groups in phenyl $R_2$ which is substituted by —$CONHC_6H_5$, —$NHCOC_6H_5$ or —$SO_2NHC_6H_5$ can have further substituents such as chlorine atoms and/or methyl and/or methoxy groups.

A heterocyclic aromatic radical A is derived for example from the following heterocyclic amines: 5-aminobenzimidazolone, 5-amino-1-methylbenzimidazolone, 5-amino-1-n-butylbenzimioazolone, 5-amino-1-phenylbenzimidazolone, 5-amino-1-p-chlorophenylbenzimidazolone, 5-amino-1-p-methylphenylbenzimidazolone, 5-amino-1-p-methoxyphenylbenzimidazolone, 5-amino-6-chlorobenzimidazolone, 5-amino-6-bromobenzimidazolone, 5-amino-6-methylbenzimidazolone, 5-amino-6-methoxyoenzimidazolone, 6-aminobenzoxazolone, 5-aminobenzoxazolone, 5-amino-7-chlorobenzoxazolone, 6-amino-5-chlorobenzoxazolone, 6-amino-5-methylbenzoxazolone, 6-amino-5-chlorobenzothiazolone, 6-amino-5-methylbenzothiazolone, 6-aminoquinazol-4-one, 6-amino-2-methylquinazol-4-one, 6-amino- 2-methoxyquinazol-4-one, 6-amino-7-chloro-2-methylquinazol-4-one, 7-aminoquinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3'-chlorophenyl)-quinazol-4-one, 2-(3'-amino-4'-methylphenyl)-quinazol-4-one, 6-amino-2,4-dihydroxyquinazoline, 7-aminophenmorphol-3-one, 6-aminophenmorphol-3-one, 7-amino-6-chlorophenmorphol-3-one, 7-amino-6-methylphenmorphol-3-one, 7-amino-6-methoxyphenmorphol-3-one, 6-aminoquinol-2-one, 6-amino-4-methylquinol-2-one, 7-amino-4-methylquinol-2-one, 7-amino-4,6-dimethylquinol-2-one, 6-amino-7-chloro-4-methylquinol-2-one, 7-amino-4methyl-6-methoxyquinol-2-one, 6-amino-1,3-dihydroxyisoquinoline, 6-amino-2,4-dihydroxyquinoline, 6-amino-2,3-dihydroxyquinoxaline and 4-aminophthalimide.

M is for example an Ni, Cu, Co or Zn atom. Preference is given to Ni and Cu compounds of the formulae I and Ia respectively. It is also possible to use mixtures of metal complexes, for example mixtures of Ni and Zn or of Co and Zn complexes.

Of particular interest is the use of compounds of the formula I in which R is —H, $R_1$ is —H, —$CH_3$ or phenyl, M is a nickel or copper atom and A is a radical of the formula II

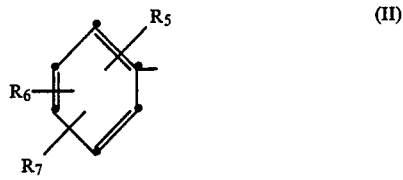

(II)

in which $R_5$ is —H, —Cl, —$CH_3$, —$OCH_3$, —$NO_2$, —CN, —$CF_3$ —COOH, —$CONH_2$, —$SO_2NH_2$, —$CONHR_2$, —$COOR_3$ or —$NHCOR_4$, $R_6$ is —H, —Cl, —$CH_3$, —$OCH_3$, —$CONH_2$ or —$COOR_3$, and $R_7$ is —H or —Cl, $R_2$ being $C_1$-$C_4$-alkyl or phenyl which is unsubstituted or substituted oy —Cl, —$CF_3$, —$CH_3$, —$OCH_3$, —$NO_2$, —CN, —$CONH_2$, —$SO_2NH_2$, —$CONHC_1$-$C_4$-alkyl, —$CONHC_6H_5$, $C_2$-$C_5$-alkoxycarbonyl, $C_2$-$C_5$-N-alkylcarbamoyl, —$NHCOC_6H_5$, —$SO_2NHC_6H_5$ or —$SO_2NHC_1$-$C_4$-alkyl, $R_3$ being $C_1$-$C_4$-alkyl, benzyl or phenyl which is unsubstituted or substituted by —Cl, —$CH_3$, —$OCH_3$, $C_2$-$C_5$-alkoxycarbonyl or $C_2$-$C_5$-N-alkylcarbamoyl and $R_4$ being —$CH_3$ or phenyl which is unsubstituted or substituted by —Cl, —$CH_3$, —$OCH_3$, —$NO_2$ or $C_2$-$C_5$-N-alkylcaroamoyl.

Of very particular interest is the use of compounds of the formula I in which R is —H, $R_1$ is —H or —$CH_3$, M is a nickel atom and A is a radical of the formula II in which $R_5$ is —H, —Cl, —$CH_3$, —$OCH_3$, —$NO_2$, —$CF_3$, —COOH, —$COOCH_3$, —$CONH_2$, —$CONHC_6H_5$, —$NHCOCH_3$ or —$NHCOC_6H_5$, $R_6$ is —H, —Cl or —$CH_3$ and $R_7$ is —H or —Cl.

The invention also provides the compounds of the formulae I and Ia.

In the formula I, when R is —Cl, —$CH_3$ or —$OCH_3$ and $R_1$ is —H, $C_1$-$C_4$-alkyl or phenyl which is unsubstituted or substituted by halogen, $C_1$-$C_4$-alkyl, $C_1$-$C_4$-alkoxy, —$NO_2$, —$CONH_2$, —$CONHR_2$ or $C_2$-$C_5$-N-alkylcarbamoyl, A is a phenyl radical which is unsubstituted or substituted by halogen, phenyl, phenylazo, —$CF_3$, —$NO_2$, —COOH, $C_1$-$C_4$-alkyl, $C_1$-$C_4$-alkoxy, —$CONH_2$, —$SO_2NH_2$, —$CONHR_2$, —$COOR_3$ —$NHCOR_4$ or —$SO_2NHR_2$, $R_2$ being $C_1$-$C_4$-alkyl or phenyl which is unsubstituted or substituted by halogen, —$CF_3$, $C_1$-$C_4$ alkyl, $C_1$-$C_4$-alkoxy, —$NO_2$, —CN, —$CONH_2$, $SO_2NH_2$, —$CONHC_1$-$C_4$-alkyl, —$CONHC_6H_5$, $C_2$-$C_5$-alkoxycarbonyl, $C_2$-$C_5$-N-alkylcarbamoyl, —$NHCOC_6H_5$, —$SO_2NHC_1$-$C_4$-alkyl or —$SO_2NHC_6H_5$, $R_3$ being $C_1$-$C_4$-alkyl, benzyl which is unsuostituted or substituted by halogen or $C_1$-$C_4$-alkyl or phenyl which is unsubstituted or substituted by halogen, $C_1$-$C_4$-alkyl, $C_1$-$C_4$-alkoxy, $C_2$-$C_5$-alkoxycarbonyl or $C_2$-$C_5$-N-alkylcarbamoyl and $R_4$ being $C_1$-$C_4$-alkyl or phenyl which is unsubstituted or substituted oy halogen, $C_1$-$C_4$-alkyl, $C_1$-$C_4$-alkoxy, —$NO_2$ or $C_2$-$C_5$-N-alkylcarbamoyl, and A is also a naphthyl radical which is unsubstituted or substituted by halogen or —$CH_3$, an anthraquinonyl radical which is unsubstituted or substituted by halogen, —$NO_2$, —$CH_3$, —$OCH_3$, —$NHCOCH_3$ or —$NHCOC_6H_5$, or a heterocyclic aromatic radical which is unsubstituted or substituted by —Cl, —$CH_3$ or —$OCH_3$, and M is a divalent transition metal, and further in the formula I, when R and $R_1$ are both a hydrogen atom, M is as defined above and A is a group of the formula III

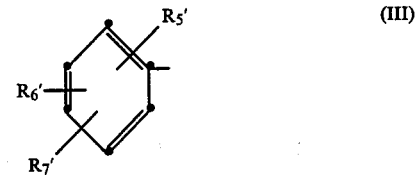

(III)

in which
$R_5'$ is —CN, —$CONHR_2$, —$COOR_3$ or —$NHCOR_4$,
$R_6'$ is —H, halogen, $C_1$-$C_4$-alkyl, $C_1$-$C_4$-alkoxy, —$CONH_2$, —$CONHR_2$, —$COOR_3$ or —$NHCOR_4$, $R_2$, $R_3$ and $R_4$ being as defined above, and
$R_7'$ is —H or halogen, or
A is also a naphthyl radical which is unsubstituted or substituted by halogen or —$CH_3$, an anthraquinonyl radical which is unsubstituted or substituted by halogen, —$NO_2$, —$CH_3$, —$OCH_3$, —$NHCOCH_3$ or —$NHCOC_6H_5$ or a heterocyclic aromatic radical which is unsubstituted or substituted by —Cl, —$CH_3$ or —$OCH_3$.

In the formula Ia A is a phenyl radical which is unsubstituted or substituted by halogen, phenyl, phenylazo, —$CF_3$, —COOH, —$NO_2$, —CN, $C_1$-$C_4$-alkyl, $C_1$-$C_4$-alkoxy, —$CONH_2$, —$SO_2NH_2$, —$CONHR_2$, —$COOR_3$, —$NHCOR_4$ or —$SO_2NHR_2$, $R_2$ being $C_1$-$C_4$-alkyl or phenyl which is unsubstituted or substituted by halogen, —$CF_3$, $C_1$-$C_4$-alkyl, $C_1$-$C_4$-alkoxy, —$NO_2$, —CN, —$CONH_2$, —$SO_2NH_2$, —$CONHC_1$-$C_4$-alkyl, $CONHC_6H_5$, $C_2$-$C_5$-alkoxycarbonyl, $C_2$-$C_5$-N-alkylcarbamoyl, —$NHCOC_6H_5$, —$SO_2NHC_1$-$C_4$-alkyl or —$SO_2NHC_6H_5$, $R_3$ being $C_1$-$C_4$-alkyl, benzyl which is unsubstituted or substituted by halogen or $C_1$-$C_4$-alkyl or phenyl which is unsubstituted or substituted by halogen, $C_1$-$C_4$-alkyl, $C_1$-$C_4$-alkoxy, $C_2$-$C_5$-alkoxycarbonyl or $C_2$-$C_5$-N-alkylcarbamoyl and $R_4$ being $C_1$-$C_4$-alkyl or phenyl which is unsubstituted or substituted by halogen, $C_1$-$C_4$-alkyl, $C_1$-$C_4$-alkoxy, —$NO_2$ or $C_2$-$C_5$-N-alkylcarbamoyl, and A is also a naphthyl radical which is unsubstituted or substituted by halogen or —$CH_3$, an anthraquinonyl radical which is unsubstituted or substituted by halogen, —$NO_2$, —$CH_3$, —$OCH_3$, —$NHCOCH_3$ or —$NHCOC_6H_5$ or a heterocyclic aromatic radical which is unsubstituted or substituted by —Cl, —$CH_3$ or —$OCH_3$, $R_1$ is —H, $C_1$-$C_4$-alkyl or phenyl which is unsubstituted or subtituted by halogen, $C_1$-$C_4$-alkyl, $C_1$-$C_4$-alkoxy, —$NO_2$, —$CONH_2$, —$CONHR_2$ or $C_2$-$C_5$-N-alkylcarbamoyl, X is —CH=, when $R_1$ must not be a hydrogen atom, or —N=, and M is a divalent transition metal.

Preference is given to those compounds of the formula I in which, when $R_1$ is —$CH_3$ or phenyl, R is —H, M is a copper or nickel atom, and A is the radical of the formula II

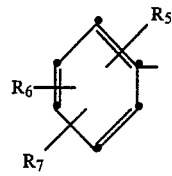 (II)

where R$_5$ is —H, —Cl, —CH$_3$, —OCH$_3$, —NO$_2$, —CN, —CF$_3$, —COOH, —CONH$_2$, —SO$_2$NH$_2$, —CONHR$_2$, —COOR$_3$ or —NHCOR$_4$, R$_6$ is —H, —Cl, —CH$_3$, —OCH$_3$, —CONH$_2$ or —COOR$_3$ and R$_7$ is —H or —Cl, R$_2$ being C$_1$-C$_4$-alkyl or phenyl which is unsubstituted or substituted by —Cl, —CF$_3$, —CH$_3$, —OCH$_3$, —NO$_2$, —CN, —CONH$_2$, —SO$_2$NH$_2$, —CONC$_1$-C$_4$-alkyl, CONHC$_6$H$_5$, C$_2$-C$_5$-alkoxycarbonyl, C$_2$-C$_5$-N-alkylcarbamoyl, —NHCOC$_6$H$_5$, —SO$_2$NHC$_6$H$_5$ or —SO$_2$NHC$_1$-C$_4$-alkyl, R$_3$ being C$_1$-C$_4$-alkyl, benzyl or phenyl which is unsubstituted or substituted by —Cl, —CH$_3$, —OCH$_3$, C$_2$-C$_5$-alkoxycarbonyl or C$_2$-C$_5$-N-alkylcarbamoyl, and R$_4$ being —CH$_3$ or phenyl which is unsubstituted or substituted by —Cl, —CH$_3$, —OCH$_3$, —NO$_2$ or C$_2$-C$_5$-N-alkylcarbamoyl, and when R$_1$ is a hydrogen atom, R and M are as defined above and A is the radical of the formula III

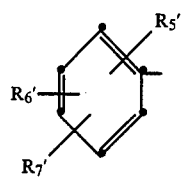 (III)

in which
R$_5'$ is —CN, —CONH$_2$, —COOR$_3$ or —NHCOR$_4$,
R$_6'$ is —H, —Cl, C$_1$-C$_4$-alkyl, C$_1$-C$_4$-alkoxy, —CONH$_2$, —CONHR$_2$, —COOR$_3$ or —NHCOR$_4$, R$_2$, R$_3$ and R$_4$ being as defined above, and
R$_7'$ is —H or —Cl.

Of particular interest are those compounds of the formula I in which R and R$_1$ are a hydrogen atom, M is a nickel atom and A is a group of the formula III in which R$_5'$ is —CONH$_2$, —CONHCH$_3$, —CONHC$_6$H$_5$ or —COOCH$_3$, R$_6'$ is —H, —Cl or —CH$_3$ and R$_7'$ is —H or —Cl.

The compounds of the formulae I and Ia can be prepared by methods known per se, for example by diazotisation of an amine of the formula A-NH$_2$ and subsequent coupling with a hydroxybenzaldehyde or hydroxyketone of the formulae IV and V

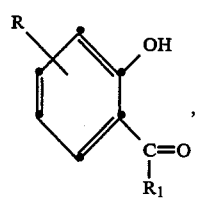 (IV)

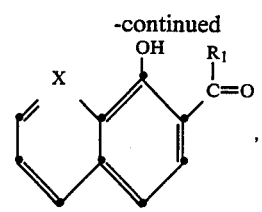 (V)

to give the azo compound of the formulae VI and VII respectively

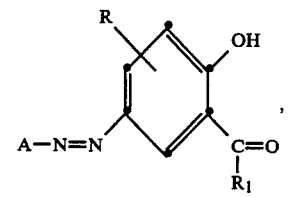 (VI)

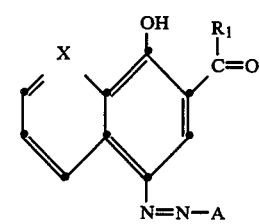 (VII)

The latter are reacted with hydroxylamine to give the aldoxime and ketoxime derivative of the formulae VIII and IX respectively

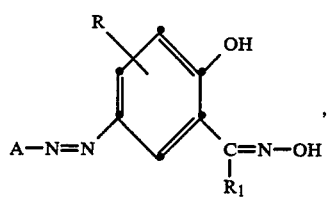 (VIII)

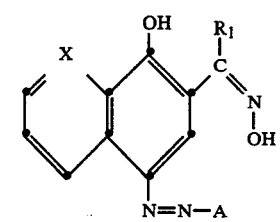 (IX)

and are then converted by means of suitable transition metal salts into metal complexes of the formulae I and Ia respectively.

The compounds of the formula VIII and IX are also obtained by diazotisation of an amine of the formula A-NH$_2$ and coupling of the resulting diazo compound with an aldoxime or ketoxime of the formula X or XI

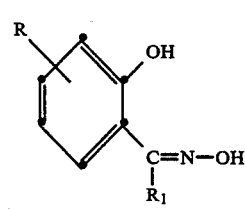 (X)

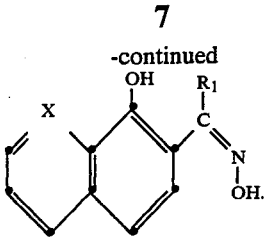

In the formulae IV to XI, A, X, R and $R_1$ are as defined above.

The necessary intermediates of the formula $A-NH_2$ and of the formulae IV and V are known compounds. Examples of compounds of the formula $A-NH_2$ are: aniline, 2-chloroaniline, 3-chloroaniline, 4-chloroaniline, 2-trifluoromethylaniline, 3-trifluoromethylaniline, 2,3-dichloroaniline, 2,4-dichloroaniline, 2,5-dichloroaniline, 3,4-dichloroaniline, 3,5-dichloroaniline, 2-chloro-5-trifluoromethylaniline, 4-chloro-2-trifluoromethylaniline, 2,3,4-trichloroaniline, 2,4,5-trichloroaniline, 2-methylaniline, 3-methylaniline, 4-methylaniline, 2-methyl-3-chloroaniline, 2-methyl-5-chloroaniline, 4-methyl-2-chloroaniline, 4-methyl-3-chloroaniline, 5-methyl-2-chloroaniline, 2-methoxyaniline, 3-methoxyaniline, 4-methoxyaniline, 2-methoxy-3-chloroaniline, 2-methoxy-4-chloroaniline, 2-methoxy-5-chloroaniline, 2-cyanoaniline, 2-nitroaniline, 3-nitroaniline, 4-nitroaniline, 2-nitro-4-chloroaniline, 2-nitro-5-chloroaniline, 2-nitro-4-trifluoromethylaniline, 3-nitro-4-chloroaniline, 3-nitro-6-chloroaniline, 4-nitro-2-chloroaniline, 4-nitro-3-chloroaniline, 4-nitro-2-bromoaniline, 2-nitro-4-methylaniline, 2-nitro-4-methoxyaniline, 3-nitro-6-methylaniline, 2-nitro-6-methoxyaniline, 3-nitro-4-methylaniline, 3-nitro-4-methoxyaniline, 4-nitro-2-methylaniline, 4-nitro-2-methoxyaniline, 4-chloro-2,5-dimethoxyaniline, 4-nitro-2,5-dichloroaniline, 2-methyl-4,5-dichloroaniline, 2-methoxy-4-nitro-5-chloroaniline, 2,5-dimethoxy-4-chloroaniline, 3-acetylaminoaniline, 4-acetylaminoaniline, 2-chloro-5-acetylaminoaniline, 2-methoxy-5-acetylaminoaniline, 2-methyl-5-acetylaminoaniline, ethyl 3-amino-4-chlorobenzoate, ethyl 3-amino-4-methylbenzoate, 3-aminobenzamide, 4-aminobenzamide, 3-amino-4-chlorobenzamide, 3-amino-4-methylbenzamide, 3-amino-4-methoxybenzamide, 3-amino-4-chlorobenzanilide, 3-amino-4-methylbenzanilide, 3-amino-4-methoxybenzanilide, 3-aminobenzenesulfonamide, 4-aminobenzenesulfonamide, 5-aminobenzimidazolone, 5-amino-6-chlorobenzimidazolone, 7-amino-4-methylquinol-2-one, 7-amino-6-chloro-4-methylquinol-2-one, 7-amino-4,6-dimethylquinol-2-one, 7-aminoquinazol-4-one, 6-aminophenmorphol-3-one, 6-aminobenzoxazine-2,4-dione, 1-aminoanthraquinone, 2-aminoanthraquinone, 1-aminonaphthalene, 2-aminonaphthalene, 4-aminoazobenzene, dimethyl aminoterephthalate, dimethyl 5-aminoisophthalate, 1-amino-2-methylanthraquinone, 1-amino-4-acetylaminoanthraquinone and 1-amino-4-benzoylaminoanthraquinone.

Examples of compounds of the formulae IV and V are: 2-hydroxybenzaldehyde, 2-hydroxy-3-chlorobenzaldehyde, 2-hydroxy-4-chlorobenzaldehyde, 2-hydroxy-3-methylbenzaldehyde, 2-hydroxy-4-methylbenzaldehyde, 2-hydroxy-6-methylbenzaldehyde, 2-hydroxy-3-methoxybenzaldehyde, 2-hydroxy-4-methoxybenzaldehyde, 2-hydroxyacetophenone, 2-hydroxy-3-chloroacetophenone, 2-hydroxy-4-chloroacetophenone, 2-hydroxy-3-methylacetophenone, 2-hydroxy-4-methylacetophenone, 2-hydroxy-3-methoxyacetophenone, 2-hydroxy-4-methoxyacetophenone, 2-hydroxybenzophenone, 2-hydroxy-3-chlorobenzophenone, 2-hydroxy-4-chlorobenzophenone, 2-hydroxy-3-methylbenzophenone, 2-hydroxy-4-methylbenzophenone, 2-hydroxy-3-methoxybenzophenone, 2-hydroxy-4-methoxybenzophenone, 2-hydroxy-4,4'-dichlorobenzophenone, 2-hydroxy-3,4'-dichlorobenzophenone, 2-hydroxy-3,6-dimethylbenzaldehyde, 1-hydroxy-2-naphthaldehyde, 1-hydroxy-2-acetylnaphthalene, 1-hydroxy-2-benzoylnaphthalene and 8-hydroxy-7-formylquinoline.

The metallisation can be effected for example with the acetates, chlorides, sulfates, nitrates or phosphates of nickel, copper, cobalt or zinc. It is also possible to use coordination compounds of the transmission metals mentioned, for example nickel acetylacetonate or copper tetraaminosulfate. The metallisation is advantageously carried out in organic solvents.

Examples of solvents are: methanol, isopropanol, n-butanol, ethylene glycol, ethylene glycol monomethyl ether, ethylene glycol monoethyl ether, dimethylformamide, nitrobenzene, dichlorobenzene, toluene and glacial acetic acid. Mixtures of organic solvents, organic solvents with water and water alone can also be used.

The reaction takes place at elevated temperature, preferably between 50° C. and the boiling point of the solvent used.

The resulting metal complexes of the formulae I and Ia can be readily isolated by filtration. Any impurities can be removed by washing.

Depending on the nature of their substituents, and on the nature of the polymers to be coloured, the compounds of the formulae I and Ia can be used as polymer-soluble dyes or in particular as pigments. In the latter case, it is advantageous to convert the products obtained in the synthesis into a finely disperse form. That can be effected in various ways, for example by milling or kneading, advantageously in the presence of milling assistants, such as inorganic or organic salts with or without addition of organic solvents. After the milling the assistants are removed in conventional manner, soluble inorganic salts for example with water and water-insoluble organic salts for example by steam distillation.

It can prove to be advantageous to subject the metal complexes of the formulae I and Ia to an aftertreatment with organic solvents, preferably with those which boil at above 100° C.

Particularly suitable for this purpose are benzenes which are substituted by halogen atoms or alkyl or nitro groups, such as xylenes, chlorobenzene, o-dichlorobenzene, toluene or nitrobenzene, alcohols, such as isopropanol or isobutanol, ketones, such as cyclohexanone, ethers, such as ethylene glycol monomethyl ether or ethylene glycol monoethyl ether, amides, such as dimethylformamide or N-methylpyrrolidone, dimethyl sulfoxide, sulfolane and water alone, if desired under pressure. The aftertreatment can also be carried out in water in the presence of organic solvents and/or with addition of surface-active substances or aliphatic amines or in liquid ammonia.

By means of the abovementioned aftertreatments, it is possible to control or optimise the metal complexes of the formulae I and Ia in respect of their particle size and their pigment properties, such as tinctorial strength, migration, light and weathering fastness properties and hiding power.

Depending on the intended use, it is found to be advantageous to use the pigments as toners or in the form of preparations.

The high-molecular organic material to be coloured according to the invention can be of natural or artificial origin. Examples of possible materials are natural resins, drying oils, rubber and casein or modified natural substances, such as chlororubber, oil-modified alkyd resins, viscose, cellulose ethers or esters, such as cellulose acetate, cellulose propionate, cellulose acetobutyrate or nitrocellulose but in particular synthetic organic polymers (thermosets and thermoplastics), as obtained by polymerisation, polycondensation or polyaddition. Examples from the class of polymerisation resins are primarily polyolefines, such as polyethylene, polypropylene or polyisobutylene, substituted polyolefins, such as polymers of vinyl chloride, vinyl acetate, styrene, acrylonitrile, acrylate ester and/or methacrylate ester or butadiene, and copolymers of the monomers mentioned, in particular ABS or EVA.

Examples from the class of polyaddition resins and polycondensation resins are the condensation products of formaldehyde with phenols, namely the so-called phenolic resins, and the condensation products of formaldehyde with urea, thiourea and melamine, namely the so-called amino resins; the polyesters, both saturated, for example alkyd resins, and unsaturated, for example maleate resins, which are used as coating resins; and the linear polyesters and amides or silicones.

The high-molecular compounds mentioned can be present individually or in mixtures, as amorphous compositions or melts which, if desired, can be spun into fibres.

They can also be present in the polymerised state in dissolved form as foam-forming agents or binders for lacquers or printing inks, such as linseed oil varnish, nitrocellulose, alkyl resins, melamine resins, urea-formaldehyde resins and acrylic resins.

The high-molecular organic substances are pigmented with the compounds of the formulae I and/or Ia, for example, by admixing these substrates with such a pigment, if desired in the form of a masterbatch, using rolling mills and mixing or milling apparatus. The pigmented material is then poured onto the desired final shape using methods known per se, such as calendering, pressing, extruding, brushing, spinning, casting or injection-moulding. In the preparation of non-rigid shapes or to reduce their brittleness, it is frequently desirable to mix the high-molecular compounds before their shaping stage with plasticisers. Examples thereof are esters of phosphoric acid, phthalic acid or sebacic acid. The plasticisers can be incorporated into the polymers in the process according to the invention before or after the pigment dye is incorporated. It is also possible—for the purpose of obtaining different hues—to include in the high-molecular organic substances, aside from the compounds of the formulae I and Ia, also fillers and other colouring components, such as white, coloured or black pigments in any amounts.

For the pigmentation of paints and printing inks, the high-molecular organic materials and the metal complexes of the formulae I and Ia are finely dispersed or dissolved in a common organic solvent or solvent mixture, if desired together with additives such as fillers, other pigments, siccatives or plasticisers. A possible procedure to this end is to disperse or dissolve the individual components separately or a number of components together, and only then to combine all the components.

Incorporated into plastics, the metal complexes to be used according to the invention can stabilise the plastics to the effects of light and weather. That is of particular importance if the coloured polymers, in particular polypropylene, are processed into fibres.

Incorporated into photostabilised high-molecular organic material, the metal complexes to be used according to the invention generally have no adverse effect on the photostability of the material. In some circumstances, it will even be noted that there is a synergistic improvement in the photostability.

The colorations obtained preferably contain 0.01–20% by weight of a compound of the formula I or Ia, for example in plastics, fibres, paints and prints, and are distinguished by high dispersibility, cross-painting, migration, heat, light and weathering fastness, a high tinctorial strength and by a high gloss.

Present in the polymers used in the form of solutions, the compounds of the formulae I and/or Ia are likewise distinguished by a pure hue, a high tinctorial strength and light fastness.

In the examples which follow, parts and percentages are by weight, unless otherwise stated.

EXAMPLE 1

65 g of stabilised polyvinyl chloride, 35 g of dioctyl phthalate and 0.2 g of finely divided 1:2 nickel complex of the formula XII

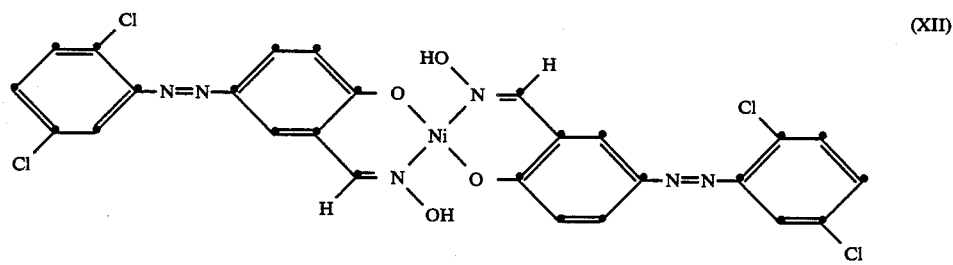

(XII)

are stirred together and are rolled at 160° C. on a two-roll calender for 7 minutes. The result is a yellow-coloured film having very good light and migration fastness.

Preparation of the finely divided form of the 1:2 nickel complex:

25 g of 1:2 nickel complex, 100 g of finely ground sodium chloride and 30 g of diacetone alcohol are kneaded together with cooling in a laooratory kneader for 5 hours. The mixture is added to 4000 ml of water, and the resulting suspension is filtered. The isolated pigment is washed with water and dried at 80° C. in vacuo.

EXAMPLE 2

10 g of titanium dioxide and 2 g of 1:2 nickel complex of the formula XII are ball-milled with 88 g of a mixture of 26.4 g of cocoalkyd resin, 24.0 g of melamineformaldehyde resin (50% solids content), 8.8 g of ethylene glycol monomethyl ether and 28.8 g of xylene for 8 hours. The result on spraying this paint onto an aluminium foil, predrying at room temperature for 30 minutes and then baking at 120° C. for 30 minutes is a yellow coating which is distinguished by high tinctorial strength and very good crosspainting, light and weathering fastness properties.

EXAMPLE 2

4 g of the finely divided pigment of Example 1 (formula XII) are stirred into 20 g of solvent of the following composition: 50 g of Solvesso 150 ® (mixture of aromatic hyorocarbons), 15 g of butyl acetate, 5 g of Exkin II ® (ketoxime based flow-control agent), 25 of methyl isobutyl ketone, 5 g of silicone oil (1% in Solvesso 150 ®). When dispersal is complete (which takes about 15–60 minutes depending on the way the mixture is stirred, the binders, namely 48.3 g of Baycryl L 530 ® (acrylic resin, 51% in 3:1 xylene/ butanol) and 23.7 g of Maprenal TTX ® (melamine resin, 55% in butanol), are added. After brief homogenisation, the paint is applied in conventional manner, such as spraying and dipping or specifically for the continuous coating of metal sheets by coil-coating, and baked (at 130° C. for 30 minutes). The resulting yellow coatings are distinguished by very good flow, high gloss and excellent dispersal of the pigment and by good weathering fastness.

EXAMPLE 4

2 g of 1:2 nickel complex of the formula XII are pasted up with 36 g of alumina hydrate, 60 g of linseed oil varnish of medium viscosity and 2 g of cooalt linoleate using a three-roll mill. The resulting colour paste produces yellow prints which are deep and highly lightfast.

EXAMPLE 5

A polypropylene granulate suitable for fibre manufacture is thoroughly mixed with 2.5% of a pigment preparation which contains 40% of 1:2 nickel complex of the formula XII. The mixture is spun at 240°-b 260° C. on a meltspinning range into filaments which are subsequently stretched in a ratio of 1:4 on a stretch-twist range and are wound up. The result is a deep yellow coloration which is distinguished by good light, wash, dry-cleaning, gas fume fading and peroxide bleach fastness properties. If the example is repeated using polycaprolactam granulate in place of polypropylene granulate and spinning the mixture into filaments at 260°–290° C. the results are likewise very fast yellow colorations.

The preparation used above is prepared as follows:

40 g of the yellow pigment of the formula XII, 60 mg of Mg behenate and 500 g of sodium chloride are thoroughly mixed in a powder-mixer. This mixture is treated at 130° C. in a laboratory kneading machine. The resulting product is milled with water and is filtered, and the filter cake is washed until salt-free, is dried and pulverised.

EXAMPLES 6 TO 72

The procedure described in Examples 1 to 5 is repeated, except that the pigment used there is replaced by a corresponding 1:2 nickel complex of the formula XIII or XIV, likewise affording fast yellow colorations in plastics, paints, fibres and printing inks. The shades obtained with 0.2% pigment in PVC are listed in Tables I and II.

TABLE I

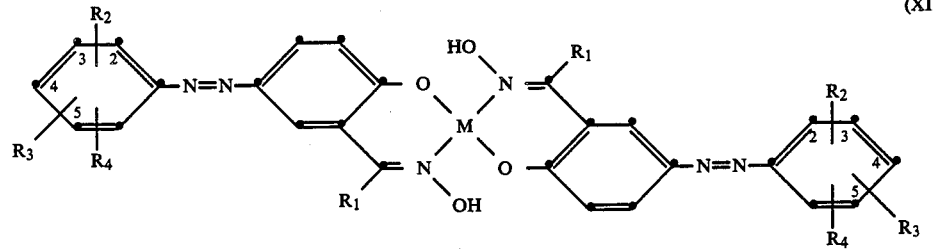

(XIII)

| Example No. | $R_1$ | $R_2$ | $R_3$ | $R_4$ | M | Shade in plasticised PVC |
|---|---|---|---|---|---|---|
| 6 | H | H | H | H | Cu | yellow |
| 7 | H | H | H | H | Ni | yellow |
| 8 | H | 2-Cl | H | H | Cu | yellow |
| 9 | H | 2-Cl | H | H | Ni | yellow |
| 10 | H | H | 3-Cl | H | Cu | yellow |
| 11 | H | H | 3-Cl | H | Ni | yellow |
| 12 | H | H | 4-Cl | H | Cu | yellow |
| 13 | H | H | 4-Cl | H | Ni | yellow |
| 14 | H | 2-Cl | 4-Cl | H | Cu | yellow |
| 15 | H | 2-Cl | 4-Cl | H | Ni | yellow |
| 16 | H | 2-Cl | 5-Cl | H | Cu | yellow |
| 17 | H | 2-Cl | 5-Cl | H | Ni | yellow |
| 18 | H | 3-Cl | 4-Cl | H | Cu | yellow |
| 19 | H | 3-Cl | 4-Cl | H | Ni | yellow |
| 20 | H | 3-Cl | 5-Cl | H | Cu | yellow |
| 21 | H | 3-Cl | 5-Cl | H | Ni | yellow |
| 22 | H | 2-Cl | 5-CF$_3$ | H | Cu | yellow |

TABLE I-continued

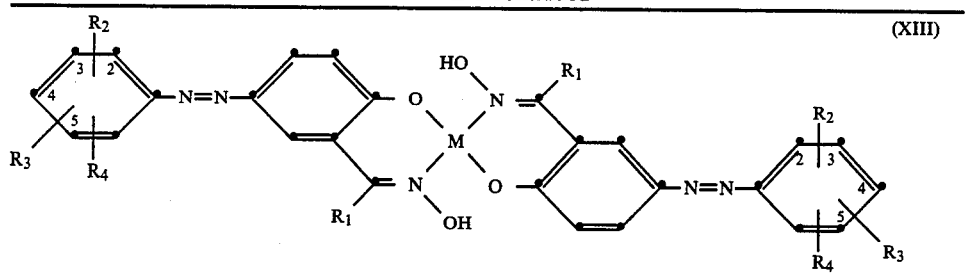
(XIII)

| Example No. | $R_1$ | $R_2$ | $R_3$ | $R_4$ | M | Shade in plasticised PVC |
|---|---|---|---|---|---|---|
| 23 | H | 2-Cl | 5-$CF_3$ | H | Ni | yellow |
| 24 | H | 4-$CH_3$ | H | H | Cu | yellow |
| 25 | H | 4-$CH_3$ | H | H | Ni | yellow |
| 26 | H | 2-$CH_3$ | 3-Cl | H | Cu | yellow |
| 27 | H | 2-$CH_3$ | 3-Cl | H | Ni | yellow |
| 28 | H | 2-$OCH_3$ | 5-Cl | H | Cu | yellow |
| 29 | H | 2-$OCH_3$ | 5-Cl | H | Ni | yellow |
| 30 | H | 2-$NO_2$ | H | H | Cu | yellow |
| 31 | H | 2-$NO_2$ | H | H | Ni | yellow |
| 32 | H | 4-$NO_2$ | H | H | Cu | brown |
| 33 | H | 4-$NO_2$ | H | H | Ni | brown |
| 34 | H | 2-$NO_2$ | 4-$CH_3$ | H | Cu | yellowish brown |
| 35 | H | 2-$NO_2$ | 4-$CH_3$ | H | Ni | yellowish brown |
| 36 | H | 2-Cl | 4-$NO_2$ | H | Cu | red |
| 37 | H | 2-Cl | 4-$NO_2$ | H | Ni | red |
| 38 | H | 2-Cl | 5-$CONH_2$ | H | Cu | yellow |
| 39 | H | 2-Cl | 5-$CONH_2$ | H | Ni | yellow |
| 40 | H | 2-Cl | 5-$COOC_2H_5$ | H | Cu | yellow |
| 41 | H | 2-Cl | 5-$COOC_2H_5$ | H | Ni | yellow |
| 42 | H | 2-$OCH_3$ | 5-CONH—(phenyl) | H | Cu | yellow |
| 43 | H | 2-$OCH_3$ | 5-CONH—(phenyl) | H | Ni | yellow |
| 44 | H | H | 3-$NHCOCH_3$ | H | Cu | yellow |
| 45 | H | H | 3-$NHCOCH_3$ | H | Ni | yellow |
| 46 | H | H | 4-COOH | H | Cu | yellow |
| 47 | H | H | 4-COOH | H | Ni | yellow |
| 48 | H | 2-Cl | 4-Cl | 5-Cl | Cu | yellow |
| 49 | H | 2-Cl | 4-Cl | 5-Cl | Ni | yellow |
| 50 | H | 2-Cl | 4-$NO_2$ | 5-Cl | Cu | brown |
| 51 | H | 2-Cl | 4-$NO_2$ | 5-Cl | Ni | brown |
| 52 | H | 2-$OCH_3$ | 4-Cl | 5-$OCH_3$ | Cu | yellow |
| 53 | H | 2-$OCH_3$ | 4-Cl | 5-$OCH_3$ | Ni | yellow |
| 54 | $CH_3$ | 2-Cl | H | H | Cu | yellow |
| 55 | $CH_3$ | 2-Cl | H | H | Ni | yellow |
| 56 | $CH_3$ | H | 3-Cl | H | Cu | yellow |
| 57 | $CH_3$ | H | 3-Cl | H | Ni | yellow |
| 58 | $CH_3$ | H | 4-Cl | H | Cu | yellow |
| 59 | $CH_3$ | H | 4-Cl | H | Ni | yellow |
| 60 | $CH_3$ | 2-Cl | 5-Cl | H | Cu | yellow |
| 61 | $CH_3$ | 2-Cl | 5-Cl | H | Ni | yellow |
| 62 | $CH_3$ | 2-Cl | 5-$CF_3$ | H | Cu | yellow |
| 63 | $CH_3$ | 2-Cl | 5-$CF_3$ | H | Ni | yellow |
| 64 | (phenyl) | 2-Cl | 5-Cl | H | Cu | yellow |
| 65 | (phenyl) | 2-Cl | 5-Cl | H | Ni | yellow |
| 66 | H | 3-Cl | 5-Cl | H | Co | yellowish brown |

TABLE I-continued

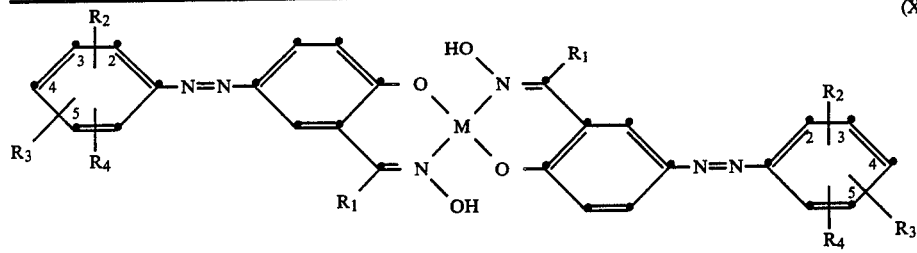
(XIII)

| Example No. | $R_1$ | $R_2$ | $R_3$ | $R_4$ | M | Shade in plasticised PVC |
|---|---|---|---|---|---|---|
| 67 | H | 2-Cl | 4-Cl | 5-Cl | Co | reddish brown |
| 68 | H | 3-Cl | 5-Cl | H | Zn | yellow |

TABLE II

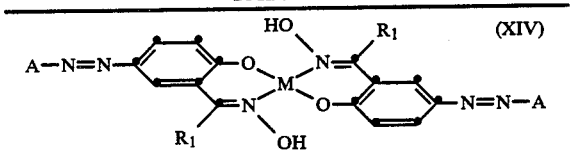
(XIV)

| Example No. | $R_1$ | A | M | Shade in plasticised PVC |
|---|---|---|---|---|
| 69 | H | 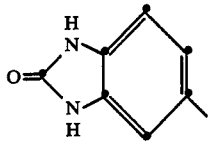 | Cu | yellow |
| 70 | H | 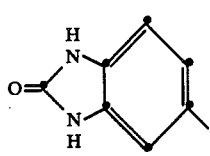 | Ni | yellow |
| 71 | H | 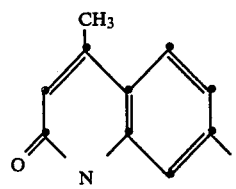 | Cu | yellow |
| 72 | H | 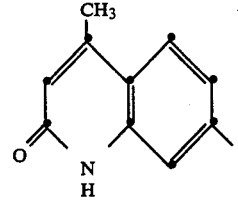 | Ni | yellow |

EXAMPLE 73

(a) 16.2 g of 2,5-dichloroaniline are stirred up in 100 ml of glacial acetic acid and 30 ml of 36% hydrochloric acid. The resulting solution is cooled down to 10° C., and 25 ml of 4N sodium nitrite solution are then added under the surface. The resulting diazo solution is stirred for 30 minutes and clarified.

13.7 of salicylaldoxime are dissolved in 100 ml of colo 2N sodium hydroxide and are then precipitated with 40 ml of glacial acetic acid. The diazo solution is added at 0°–5° C. to the salicylaldoxime suspension in the course of about 30 minutes, during which the pH is maintained at 7 to 8 with 2N NaOH solution. The suspension thus obtained is allowed to stir at 20°–25° C. for a further 6 to 8 hours and is then brought to pH 4 with 36% hydrochloric acid, and the resulting product is filtered off and is washed with hot water. The filter material is dried at 70°–80° C. in a vacuum cabinet. The result is 27.9 g (corresponding to 90% of theory) of a yellow powder of the formula

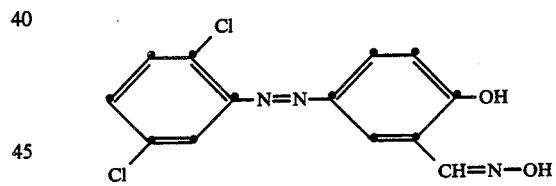

(b) 6.2 g of 5-(2',5'-dichlorophenylazo)-2-hydroxybenzaldoxime and 2.5 g of nickel acetate×4H$_2$O are stirred at 120° C. in 100 ml of dimethylformamide for 3 hours. The resulting suspension is filtered at 80° C. and the filter residue is washed with cold dimethylformamide and then cold ethanol. Drying at 60° C. in a vacuum oven leaves 6.1 g of a yellow powder of the formula

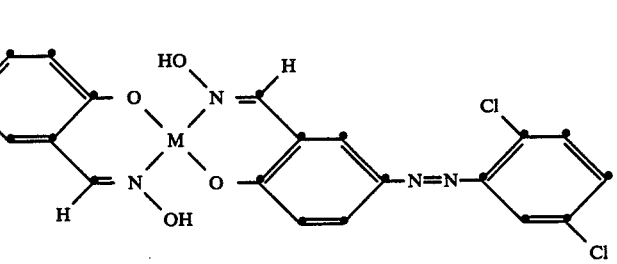

having the following microanalysis:

|  | C | H | Cl | N | Ni |
|---|---|---|---|---|---|
| Calculated (in %): | 45.99 | 2.67 | 20.89 | 12.38 | 8.65 |
| Found (in %): | 46.12 | 2.40 | 20.93 | 12.44 | 8.57 |

(c) 6.72 g of 5-(4'-chloro-2',5'-dimethoxyphenylazo)-2-hydroxyoenzaldoxime and 2.5 g of nickel acetate×4-H$_2$O are stirred at 120° C. in 100 ml of dimethylformamide for 3 hours. The reaction mixture is filtered at 80° C., and the filter residue is washed with cold dimethylformamide and then with cold ethanol. Drying at 70°-80° C. in a vacuum oven leaves 5.8 g of a yellow powder of the formula

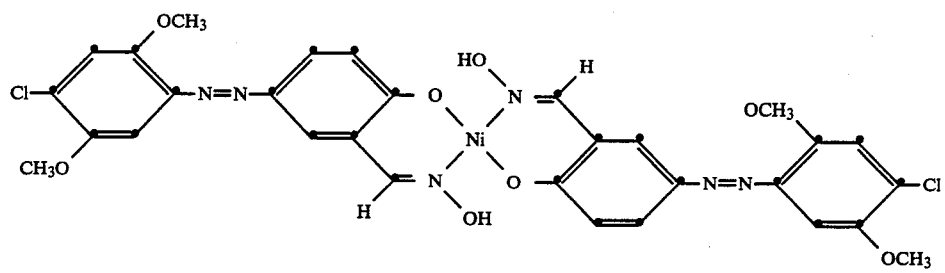

having the following microanalysis:

|  | C | H | Cl | N | Ni |
|---|---|---|---|---|---|
| Calculated (in %): | 49.48 | 3.60 | 9.74 | 11.54 | 8.65 |
| Found (in %): | 49.44 | 3.61 | 9.71 | 11.54 | 8.57 |

EXAMPLE 74

(a) 188 g of 4-chloro-2,5-dimethoxyaniline are stirred up in 2000 ml of water and 270 ml of 36% hydrochloric acid. The resulting suspension is cooled down to 10° C., and 270 ml of 4N sodium nitrite solution are then added under the surface. The resulting diazonium salt solution is subsequently sitrred for 30 minutes and clarified.

122 g of salicylaldehyde are dissolved in 2000 ml of ethyl alcohol, and 100 g of sodium acetate are added. The above diazo solution is added at 0°-5° C. to the salicylaldehyde solution in the course of about 30 minutes, during which the pH of the reaction mixture is maintained at 7 to 8 with 2N NaOH solution. The resulting suspension is allowed to stir at 20°-22° C. for 8-10 hours, and is then brought to pH 1.5 with 36% hydrochloric acid, and the product is filtered off and washed with hot water. The filter material is dried at 70°-80° C. in a vacuum oven. The result is 226 g, corresponding to 71% of theory, of a yellow powder of the formula

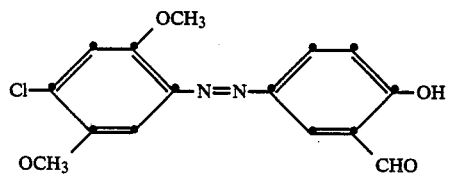

(b) 32.1 g of 5-(4'-chloro-2',5'-dimethoxyphenylazo)-2-hydroxybenzaldehyde are suspended in 300 ml of isopropanol, and 6.9 g of hydroxylamine hydrochloride and 16.4 g of anhydrous sodium acetate are added. The resulting reaction mixture is stirred at 70°-80° C. for 18 hours, and the product is filtered off and washed with cold isopropanol and then with hot water. The filter material obtained is dried at 70°-80° C. in a vacuum oven. The result is 30 g, corresponding to 30% of theory, of a yellow powder of the formula

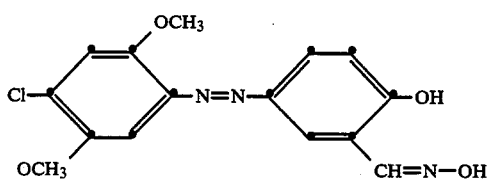

EXAMPLE 75

29.5 g of 5-(2',5'-dichlorophenylazo)-2-hydroxybenzaldehyde are suspended in 600 ml of 3% sodium hydroxide solution, and a solution of 7 g of hydroxylamine chlorohydrate in 50 ml of water is added in the course of an hour. The reddish brown reaction mixture is stirred at 90° C. for 3 hours. After filtration of this reaction mixture, the resulting filtrate is brought to pH 1 with 50 ml of 36% hydrochloric acid, and the resulting yellow precipitate is filtered off with suction, is then washed with water and is dried at 70°-80° C. in vacuo. The result is 26 g of a yellow powder of the formula

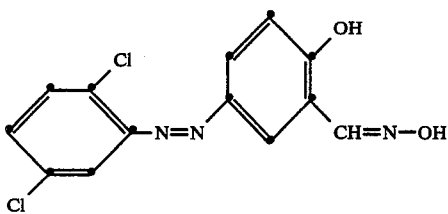

having the following microanalysis:

|  | C | H | Cl | N | O |
|---|---|---|---|---|---|
| Calculated (in %): | 50.35 | 2.93 | 22.86 | 13.55 | 10.32 |
| Found (in %): | 50.38 | 2.91 | 23.44 | 13.15 | 10.10 |

EXAMPLE 76

5.5 g of 5-(3'-chlorophenylazo)-2-hydroxybenzaldoxime are suspended in 80 ml of water, and 2 ml of 30% sodium hydroxide solution are added. A solution of 2.6 g of NiCl$_{12}$×6H$_2$O in 50 ml of water is added at 70°-80° C. in the course of 15 minutes. The resulting greenish yellow mixture is stirred at 80°-90° C. for 18 hours, and the resulting product is filtered off hot with suction and washed with warm water. Drying at 70°-80° C. in vacuo leaves a yellow pigment of the formula:

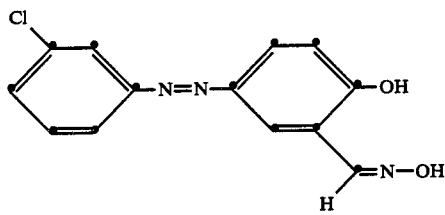

in the form of the 1:2 nickel complex

EXAMPLES 77-121

The procedure described in Examples 1 to 5 is repeated, except that the pigment used there is replaced by a corresponding 1:2 metal complex of the formulae XV to XVII, likewise affording fast colorations in plastics, paints, fibres and printing inks. The shades obtained with 0.2% pigment in PVC are listed in Tables III to V.

TABLE III

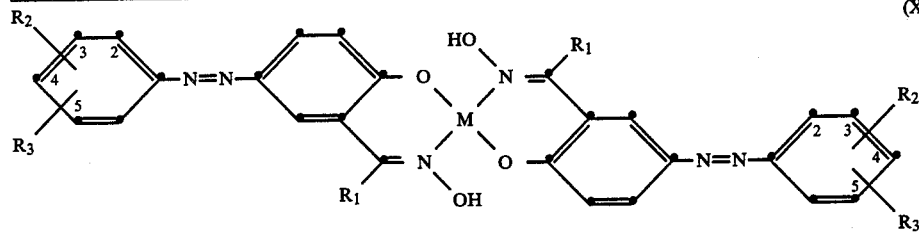

(XV)

| Example No. | $R_1$ | $R_2$ | $R_3$ | | M | Shade in plasticised PVC |
|---|---|---|---|---|---|---|
| 77 | H | H | | 4-NHCO-C₆H₅ | Cu | yellow |
| 78 | H | H | | 4-NHCO-C₆H₅ | Ni | orange yellow |
| 79 | H | H | | 4-NHCO-C₆H₅ | Co | orange yellow |
| 80 | H | H | 4-SO₂NH₂ | | Cu | yellow |
| 81 | H | H | 4-SO₂NH₂ | | Ni | yellow |
| 82 | CH₃ | H | 4-SO₂NH₂ | | Cu | yellow |
| 83 | CH₃ | H | 4-SO₂NH₂ | | Ni | yellow |
| 84 | H | H | | 4-N=N-C₆H₅ | Cu | yellow |
| 85 | H | H | | 4-N=N-C₆H₅ | Ni | yellow |
| 86 | CH₃ | H | | 4-N=N-C₆H₅ | Cu | orange |
| 87 | CH₃ | H | | 4-N=N-C₆H₅ | Ni | orange |
| 88 | H | 2-CN | H | | Cu | yellow |
| 89 | H | 2-CN | H | | Ni | yellow |
| 90 | CH₃ | 2-CN | H | | Cu | yellow |
| 91 | CH₃ | 2-CN | H | | Ni | yellow |

TABLE III-continued

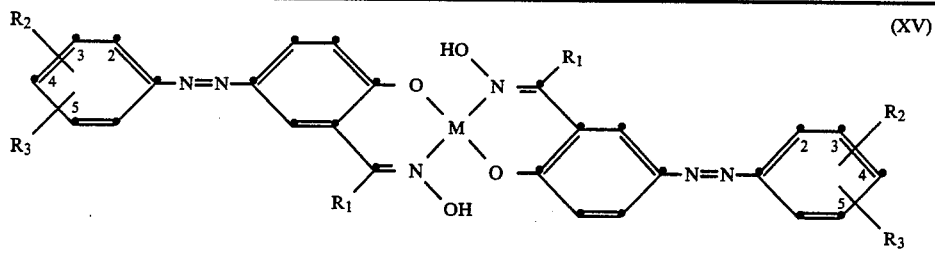

(XV)

| Example No. | $R_1$ | $R_2$ | $R_3$ | M | Shade in plasticised PVC |
|---|---|---|---|---|---|
| 92 | H | 2-OCH$_3$ | H | Cu | brownish yellow |
| 93 | H | 2-OCH$_3$ | H | Ni | brownish yellow |
| 94 | CH$_3$ | 2-OCH$_3$ | H | Cu | brownish yellow |
| 95 | CH$_3$ | 2-OCH$_3$ | H | Ni | brownish yellow |
| 96 | CH$_3$ | H | 4-OCH$_3$ | Cu | yellow |
| 97 | CH$_3$ | H | 4-OCH$_3$ | Ni | yellow |
| 98 | CH$_3$ | 2-COOCH$_3$ | 5-COOCH$_3$ | Cu | orange |
| 99 | CH$_3$ | 2-COOCH$_3$ | 5-COOCH$_3$ | Ni | orange |

TABLE IV

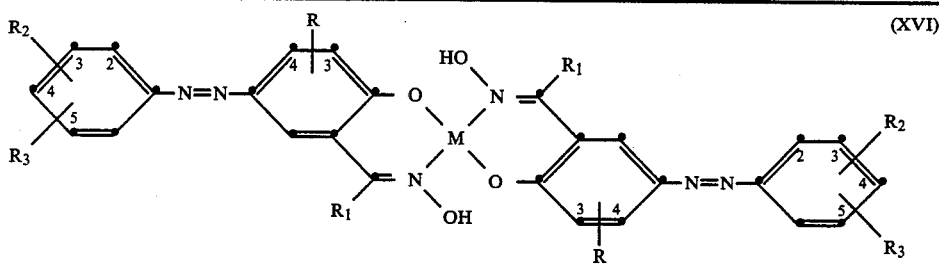

(XVI)

| Example No. | $R_1$ | $R_2$ | $R_3$ | R | M | Shade in plasticised PVC |
|---|---|---|---|---|---|---|
| 100 | H | 2-Cl | 5-Cl | 3-OCH$_3$ | Cu | yellow |
| 101 | H | 2-Cl | 5-Cl | 3-OCH$_3$ | Ni | yellow |
| 102 | H | 2-Cl | 5-CF$_3$ | 3-OCH$_3$ | Cu | yellow |
| 103 | H | 2-Cl | 5-CF$_3$ | 3-OCH$_3$ | Ni | yellow |
| 104 | CH$_3$ | 2-Cl | H | 3-OCH$_3$ | Cu | yellow |
| 105 | CH$_3$ | 2-Cl | H | 3-OCH$_3$ | Ni | yellow |
| 106 | H | H | 4-OCH$_3$ | 3-OCH$_3$ | Cu | yellow |
| 107 | H | H | 4-OCH$_3$ | 3-OCH$_3$ | Ni | yellow |
| 108 | H | 2-COOCH$_3$ | 5-COOCH$_3$ | 3-OCH$_3$ | Cu | yellow |
| 109 | H | 2-COOCH$_3$ | 5-COOCH$_3$ | 3-OCH$_3$ | Ni | yellow |
| 110 | H | 2-Cl | 5-Cl | 3-Cl | Cu | yellow |
| 111 | H | 2-Cl | 5-Cl | 3-Cl | Ni | yellow |
| 112 | CH$_3$ | 2-Cl | 5-Cl | 4-CH$_3$ | Cu | yellow |
| 113 | CH$_3$ | 2-Cl | 5-Cl | 4-CH$_3$ | Ni | yellow |
| 114 | H | 2-Cl | 5-CONHCH$_3$ | 3-OCH$_3$ | Cu | yellow |
| 115 | H | 2-Cl | 5-CONHCH$_3$ | 3-OCH$_3$ | Ni | yellow |
| 116 | H | 2-CH$_3$ | 5-COO-C$_6$H$_5$ | 3-OCH$_3$ | Cu | yellow |
| 117 | H | 2-CH$_3$ | 5-COO-C$_6$H$_5$ | 3-OCH$_3$ | Ni | yellow |

TABLE V

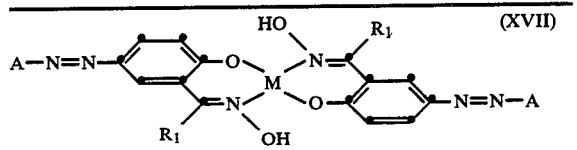

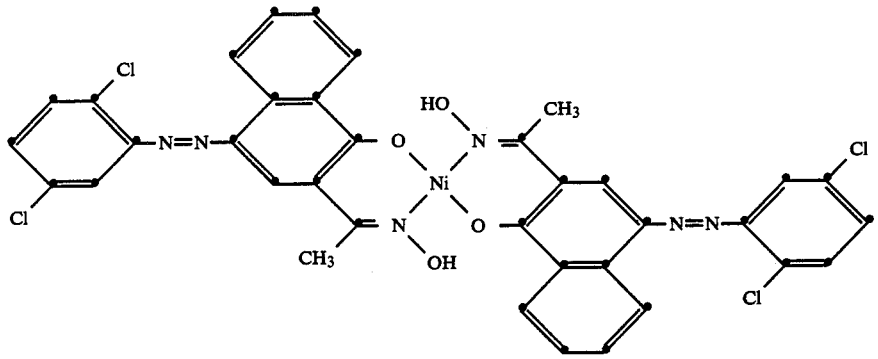

| Example No. | $R_1$ | A | M | Shade in plasticised PVC |
|---|---|---|---|---|
| 118 | H | | Cu | brown |
| 119 | H | | Ni | brown |
| 120 | H | 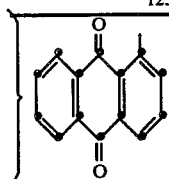 | Cu | yellow |
| 121 | H | | Ni | yellow |

EXAMPLE 122

The procedure described in Example 2 is repeated, except that the 1:2 Ni complex of the formula XII is replaced by the 1:2 Ni complex of formula XVIII, likewise affording a very fast yellow coating.

(XVIII)

EXAMPLES 123-125

The procedure described in Examples 1 to 5 is repeated, except that the pigment used there is replaced by a corresponding 1:2 Ni complex of the formula XIX, likewise affording fast colorations in plastics, paints, fibres and printing inks. The shades obtained in plasticised PVC are listed in Table VI.

TABLE VI

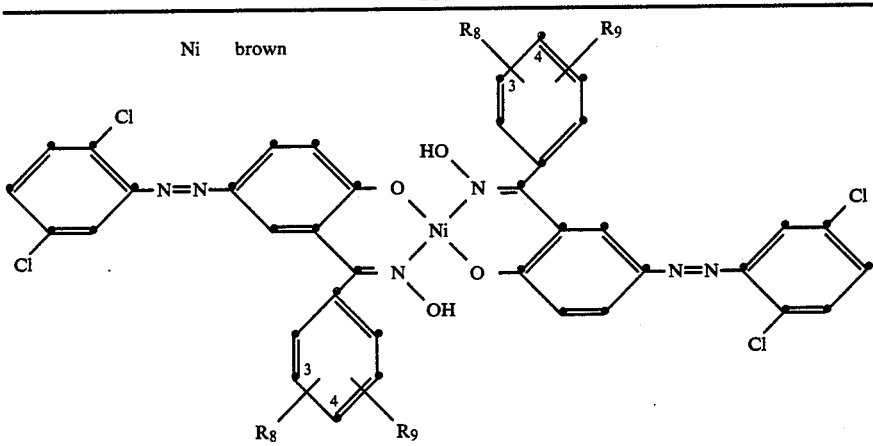

| Example No. | $R_8$ | $R_9$ | Shade in plasticised PVC |
|---|---|---|---|
| 123 | 4-Cl | H | yellow |
| 124 | 3-$CH_3$ | H | yellow |
| 125 | 4-$OCH_3$ | H | yellow |

We claim:
1. Mass-colored high-molecular weight synthetic or natural organic material having incorporated therein a compound of formula I, a compound of formula Ia or a mixture thereof

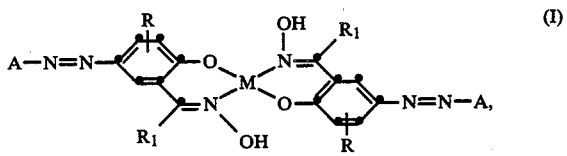

-continued

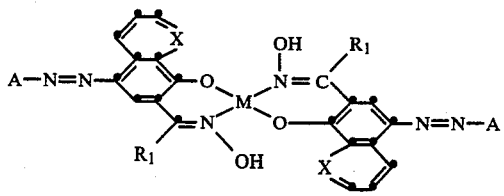

(Ia)

in which

A is a phenyl radical which is unsubstituted or substituted by halogen, phenyl, phenylazo, carboxyl, —CF₃, —NO₂, —CN, C₁-C₄-alkyl, C₁-C₄-alkoxy, —CONH₂, —SO₂NH₂, —CONHR₂, —COOR₃, —NHCOR₄ or —SO₂NHR₂, where R₂ is C₁-C₄-alkyl or phenyl which is unsubstituted or substituted by halogen, —CF₃, —C₁-C₄-alkyl, C₁-C₄-alkoxy, —NO₂, —CN, —CONH₂, —SO₂NH₂, —CONHC₁-C₄-alkyl, —CONHC₆H₅, C₂-C₅-alkoxycarbonyl, C₂-C₅-N-alkylcarbamoyl, —NHCOC₆H₅, —SO₂NH—C₁-C₄-alkyl or —SO₂NHC₆H₅, R₃ is C₁-C₄-alkyl, benzyl which is unsubstituted or substituted by halogen or C₁-C₄-alkyl, or phenyl which is unsubstituted or substituted by halogen, C₁-C₄-alkyl, C₁-C₄-alkoxy, C₂-C₅-alkoxycarbonyl or C₂-C₅-N-alkylcarbamoyl, and R₄ is C₁-C₄-alkyl or phenyl which is unsubstituted or substituted by halogen, C₁-C₄-alkyl, C₁-C₄-alkoxy, —NO₂ or C₂-C₅-N-alkylcarbamoyl, and A is also a naphthyl radical which is unsubstituted or substituted by halogen or —CH₃, an anthraquinonyl radical which is unsubstituted or substituted by halogen, —NO₂, —CH₃, OCH₃, —NHCOCH₃ or —NHCOC₆H₅, or a heterocyclic aromatic radical which is unsubstituted or substituted by —CL, —CH₃ or —OCH₃, R is —H, —Cl, —CH₃ or —OCH₃, R₁ is —H, C₁-C₄-alkyl or phenyl which is unsubstituted or substituted by halogen, C₁-C₄-alkyl, C₁-C₄-alkoxy, —NO₂, —CONH₂, —CONHR₂, or C₂-C₅-N-alkylcarbamoyl, X is —CH= or —N=, and M is a divalent transition metal, which is copper, nickel, cobalt or zinc.

2. A mass-colored material according to claim 1 having incorporated therein a compound of formula I in which R is —H, R₁ is —H, —CH₃ or phenyl, M is copper or nickel atom and A is the radical of the formula II

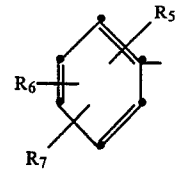

(II)

in which R₅ is —H, —CL, —CH₃, —OCH₃, —NO₂, —CN, —CF₃ —COOH, —CONH₂, —SO₂NH₂, —CONHR₂, —COOR₃ or —NHCOR₄, R₆ is —H, —Cl, —CH₃, —OCH₃, —CONH₂ or —COOR₃, and R₇ is —H or —CL, R₂ being C₁-C₄-alkyl or phenyl which is unsubstituted or substituted by —CL, —CF₃, —CH₃, —OCH₃, —NO₂, —CH, —CONH₂, —SO₂NH₂, —CONHC₁-C₄-alkyl, —CONHC₆H₅, C₂-C₅-alkoxycarbonyl, C₂-C₅-alkylcarbamoyl, —NHCOC₆H₅, —SO₂NHC₆H₅ or —SO₂NHC₁-C₄-alkyl, R₃ being C₁-Chd 4-alkyl, benzyl or phenyl which is unsubstituted or substituted by —CL, —CH₃, —OCH₃, C₂-C₅-alkoxycarbonyl or C₂-C₅-N-alkylcarbamoyl and R₄ being —CH₃ or phenyl which is unsubstituted or substituted by —CL, —CH₃, —OCH₃, —NO₂ or C₂-C₅ N-alkylcarbamoyl.

3. A mass-colored material according to claim 2 having incorporated therein a compound of formula I in which R is —H, R₁ is —H or —CH₃, M is a nickel atom and A is the group of the formula II according to claim 2 in which R₅ is —H, —Cl, —CH₃, —OCH₃, —NO₂, —CF₃, —COOH, —COOCH₃, —CONH₂, —CONHC₆H₅, —NHCOCH₃ or —NHCOC₆H₅, R₆ is —H, —CL or —CH₃ and R₇ is —H or —CL.

* * * * *